United States Patent
Kim et al.

(10) Patent No.: US 10,099,616 B2
(45) Date of Patent: Oct. 16, 2018

(54) VEHICLE AND METHOD FOR CONTROLLING THE VEHICLE

(71) Applicant: HYUNDAI MOTOR COMPANY, Seoul (KR)

(72) Inventors: Sung Un Kim, Yongin-si (KR); Ki Dong Kang, Seoul (KR); Kyunghyun Kang, Suwon-si (KR); HeeJin Ro, Seoul (KR); Seok-young Youn, Seoul (KR); Bitna Baek, Seoul (KR); Ga Hee Kim, Suwon-si (KR); Jong Hyuck Heo, Yongin-si (KR); Chisung Kim, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 371 days.

(21) Appl. No.: 14/957,521

(22) Filed: Dec. 2, 2015

(65) Prior Publication Data
US 2016/0272118 A1    Sep. 22, 2016

(30) Foreign Application Priority Data
Mar. 19, 2015    (KR) .................. 10-2015-0038448

(51) Int. Cl.
*H04N 7/18* (2006.01)
*B60R 1/00* (2006.01)
*H04N 5/232* (2006.01)
*H04N 5/44* (2011.01)

(52) U.S. Cl.
CPC ........... *B60R 1/00* (2013.01); *H04N 5/23293* (2013.01); *H04N 5/44* (2013.01); *H04N 7/183* (2013.01); *B60R 2300/50* (2013.01)

(58) Field of Classification Search
None
See application file for complete search history.

(56) References Cited

U.S. PATENT DOCUMENTS

2008/0186382 A1*  8/2008  Tauchi ............... G01S 13/89
                                                    348/148

FOREIGN PATENT DOCUMENTS

| JP | 11-195196 A | 7/1999 |
| JP | 2008-299676 A | 12/2008 |
| JP | 2008299676 A | * 12/2008 |
| JP | 2013-541915 A | 11/2013 |
| JP | 2014-089620 A | 5/2014 |
| JP | 2014089620 A | * 5/2014 |
| KR | 10-2001-0044730 A | 6/2001 |
| KR | 10-2013-0055814 A | 5/2013 |
| KR | 10-2014-0135368 A | 11/2014 |
| KR | 10-2015-0017095 A | 2/2015 |

OTHER PUBLICATIONS

Korean Office Action dated Aug. 3, 2016, issued in Korean Patent Application No. 10-2015-0038448.

* cited by examiner

*Primary Examiner* — James M Anderson, II
(74) *Attorney, Agent, or Firm* — McDermott Will & Emery LLP

(57) ABSTRACT

A vehicle includes an image obtaining unit for obtaining an image of surroundings of the vehicle, a communication unit for receiving an image from at least one of a closed-circuit television (CCTV) and another vehicle in the surroundings of the vehicle, and a display unit for displaying the image obtained by the image obtaining unit and the CCTV image received from the communication unit or the image from the other vehicle received from the communication unit.

18 Claims, 14 Drawing Sheets

VEHICLE AND METHOD FOR CONTROLLING THE VEHICLE

CROSS-REFERENCE TO RELATED APPLICATION

This application claims the benefit of priority to Korean Patent Application No. 10-2015-0038448, filed on Mar. 19, 2015 with the Korean Intellectual Property Office, the entirety of which is incorporated herein by reference.

TECHNICAL FIELD

Embodiments of the present disclosure relate to a vehicle and a method for controlling the vehicle.

BACKGROUND

Generally, a camera is mounted on a vehicle to assist in safe driving. The camera, by obtaining an image of the surroundings of the vehicle and offering the image to a driver, enables the driver to accurately recognize the conditions of the surroundings of the vehicle.

Recently, cameras are capable of photographing left and right sides of the vehicle in addition to the front and back. The cameras may allow the driver additional perspectives of vehicle surroundings, allowing the driver to more safely proceed along various roads.

However, when an area to be recorded via camera is blocked by a structure or by another vehicle, the area to be recorded is also blocked and the driver may not be able to properly view the area to be recorded. Accordingly, driving safely may be compromised.

SUMMARY OF THE DISCLOSURE

Therefore, it is an aspect of the present disclosure to provide a vehicle capable of offering a driver with further accurate conditions of the surroundings of the vehicle by use of an image obtained from a camera of the vehicle, as well as an image obtained from a CCTV at the surroundings of the vehicle.

Additional aspects of the disclosure will be set forth in part in the description which follows and, in part, will be obvious from the description, or may be learned by practice of the disclosure.

In accordance with one aspect of the present disclosure, a vehicle includes an image obtaining unit, a communication unit and a display unit. The image obtaining unit may be configured to obtain an image of surroundings of the vehicle. The communication unit may be configured to receive an image from at least one of a closed-circuit television (CCTV) and another vehicle at the surroundings of the vehicle. The display unit may be configured to display the image obtained at the image obtaining unit, and the CCTV image received from the communication unit or the image from the other vehicle received from the communication unit.

The display unit may display a plane image of the image of the surroundings of the vehicle obtained at the image obtaining unit, and a plane image of the CCTV image received from the communication unit or a plane image of the image from the other vehicle received from the communication unit.

The display unit may display a plane image of the image of the surroundings of the vehicle obtained at the image obtaining unit that is composited with respect to the vehicle as a composite image, and may display a plane image of the CCTV image received from the communication unit or a plane image of the image from the other vehicle separately from the composite image.

The display unit may display a plane image of the image of the surroundings of the vehicle obtained at the image obtaining unit, and a plane image of the CCTV image received from the communication unit or a plane image of the image from the other vehicle received from the communication unit that are composited with respect to the vehicle as a composite image.

The display unit may display a plane image of the image of the surroundings of the vehicle obtained at the image obtaining unit and a plane image of the CCTV image received from the communication unit or a plane image of the image from the other vehicle received from the communication unit that are composited with respect to a crossroad as a composite image, and may display the position of the vehicle on the composite image.

The vehicle may further include an image processing unit to process the image obtained from the image obtaining unit and the image from the communication unit as to display the images at the display unit.

The image processing unit may process the image of the surroundings of the vehicle obtained at the image obtaining unit, and the CCTV image received from the communication unit or the image from the other vehicle received from the communication unit, as plane images.

The image processing unit may composite the plane image of the image of the surroundings of the vehicle with respect to the vehicle.

The image processing unit may composite the plane image of the image of the surroundings of the vehicle with the plane image of the CCTV image or the plane image of the image from the other vehicle with respect to the vehicle as a composite image.

The image processing unit may extract a portion from the plane image of the CCTV image or the plane image of the image from the other vehicle that is not covered by the plane image of the image from the other vehicle, and may composite the image of the surroundings of the vehicle with the extracted plane image of the CCTV image or the extracted plane image of the image from the other vehicle with respect to the vehicle as a composite image.

The image obtaining unit may include a camera provided as to obtain an image having at least one of front, rear, left, and right directions of the vehicle.

The image obtaining unit may extract a portion from the plane image of the CCTV image or the plane image of the image from the other vehicle that is not covered by the plane image of the image from the other vehicle, and may composite the image of the surroundings of the vehicle with the extracted plane image of the CCTV image or the extracted plane image of the image from the other vehicle with respect to a crossroad as a composite image.

The communication unit may receive an image through a device-to-device (D2D) communication from at least one of at least one CCTV and another vehicle that are present at the surroundings of the vehicle.

In accordance with another aspect of the present disclosure, a method for controlling a vehicle includes: obtaining, at an image forming unit of the vehicle, an image of surroundings of the vehicle; receiving, at a communication unit of the vehicle, an image from at least one of a CCTV and another vehicle at the surroundings of the vehicle; and displaying, at a display unit of the vehicle, the image obtained from the image obtaining unit, and the image of the CCTV image received from the communication unit or the image from the other vehicle received from the communication unit.

The method may further include processing the image of the surroundings of the vehicle obtained at the image obtaining unit with the image of the CCTV image received from the communication unit or the image from the other vehicle received from the communication unit, as plane images.

The method may further include compositing the plane image of the image of the surroundings of the vehicle with respect to the vehicle as a composite image. The method may further include: compositing the plane image of the image of the surroundings of the vehicle with the plane image of the CCTV image or the plane image from the other vehicle with respect to the vehicle as a composite image.

The compositing of the plane image of the image of the surroundings of the vehicle with the plane image of the CCTV image or the plane image from the other vehicle with respect to vehicle may include: extracting a portion from the plane image of the CCTV image or the plane image of the image from the other vehicle that is not covered by the plane image of the surroundings of the vehicle; and compositing the plane image of the surroundings of the vehicle with the extracted plane image of the CCTV image or the extracted plane image of the image from the other vehicle with respect to the vehicle as a composite image.

The method may further include: extracting a portion from the plane image of the CCTV image or the plane image of the image from the other vehicle that is not covered by the plane image of the surroundings of the vehicle; compositing the plane image of the surroundings of the vehicle with the extracted plane image of the CCTV image or the extracted plane image of the image from the other vehicle with respect to a crossroad as a composite image; and displaying the position of the vehicle on the composite image.

The displaying of the image obtained at the image obtaining unit, and the CCTV image received from the communication unit or the image from the other vehicle received from the communication unit at the display unit of the vehicle may include: displaying, at the display unit, the plane image of the image of the surroundings of the vehicle obtained at the image obtaining unit, and the plane image of the CCTV image received from the communication unit or the plane image of the image from the other vehicle received from the communication unit.

The displaying of the image obtained at the image obtaining unit, and the CCTV image received from the communication unit or the image from the other vehicle received from the communication unit at the display unit of the vehicle may further include: displaying the plane image of the image of the surroundings of the vehicle obtained at the image obtaining unit that are composited with respect to the vehicle as a composite image; and displaying the plane image of the CCTV image received from the communication unit or the plane image of the image from the other vehicle received from the communication unit separately from the composite image.

The displaying of the image obtained at the image obtaining unit, and the CCTV image received from the communication unit or the image from the other vehicle received from the communication unit at the display unit of the vehicle may further include displaying, at the display unit, the plane image of the image of the surroundings of the vehicle obtained at the image obtaining unit, and the plane image of the CCTV image received from the communication unit or the plane image of the image from the other vehicle received from the communication unit that are composited with respect to the vehicle as a composite image.

The displaying of the image obtained at the image obtaining unit, and the CCTV image received from the communication unit or the image from the other vehicle received from the communication unit at the display unit of the vehicle may further include: displaying the plane image of the image of the surroundings of the vehicle obtained at the image obtaining unit, and the plane image of the CCTV image received from the communication unit or the plane image of the image from the other vehicle received from the communication unit that are composited with respect to a crossroad as a composite image.

The method may further include displaying the position of the vehicle on the composite image that is composited with respect to the crossroad.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
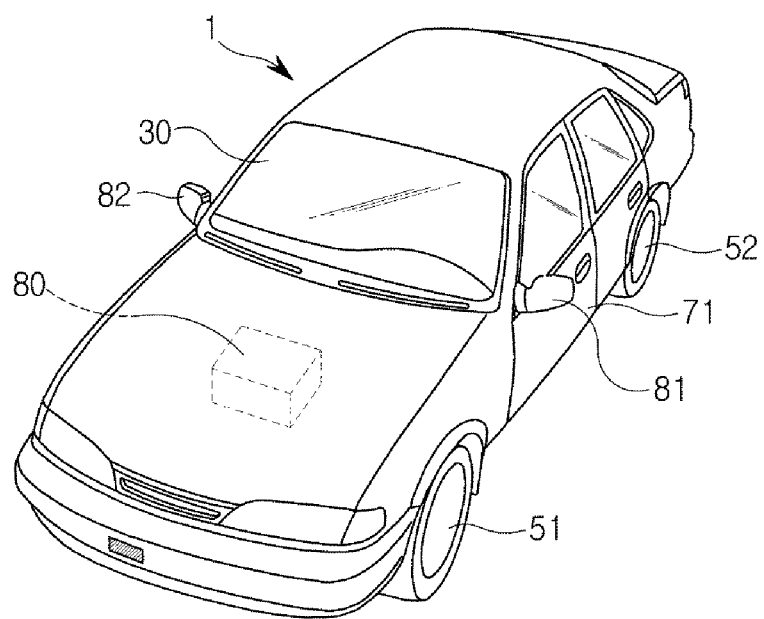
FIG. 1 is a drawing schematically illustrating an exterior structure of a vehicle according to one embodiment of the present disclosure.

Reference will now be made in detail to the embodiments of the present disclosure, examples of which are illustrated in the accompanying drawings, wherein like reference numerals refer to like elements throughout.

Figure 2:
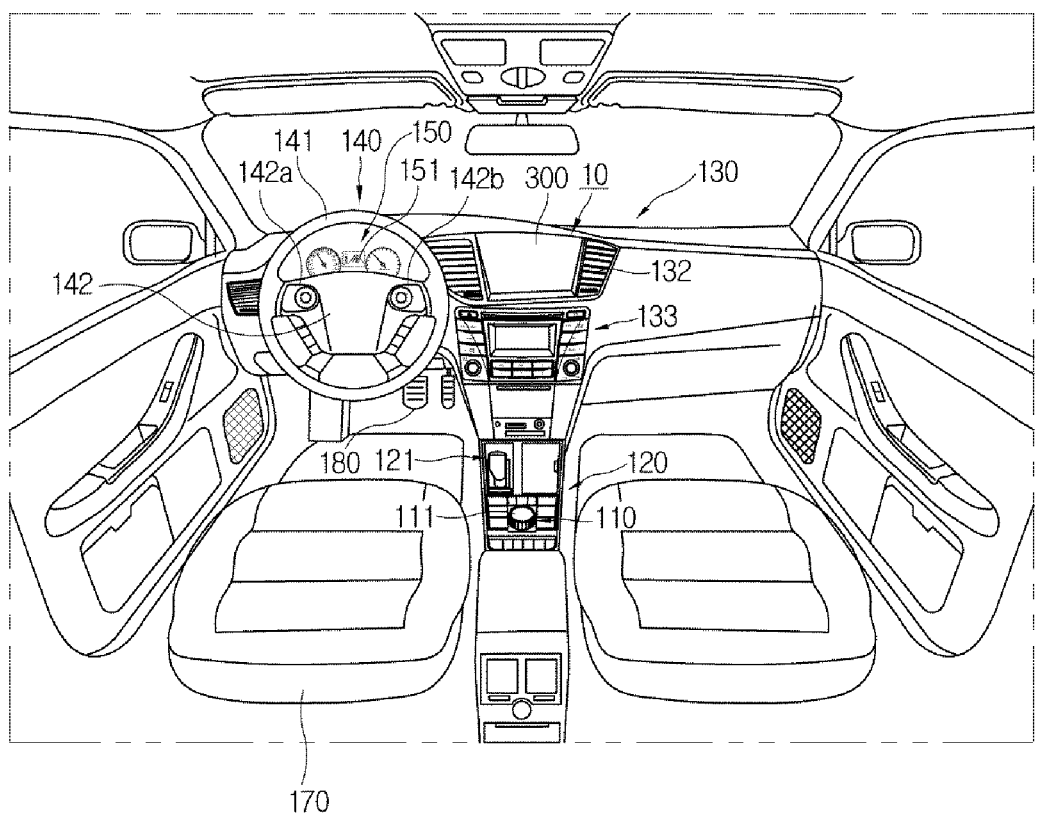
FIG. 2 is a drawing illustrating an interior structure of the vehicle according to one embodiment of the present disclosure.

FIG. 1 is a drawing schematically illustrating an exterior structure of a vehicle according to one embodiment of the present disclosure, and FIG. 2 is a drawing illustrating an interior structure of the vehicle according to one embodiment of the present disclosure.

Referring to FIG. 1, a vehicle 100 according to one embodiment of the present disclosure includes a body 1 forming an exterior appearance of the vehicle 100, wheels 51 and 52 to move the vehicle 100, a driving apparatus 80 rotating the wheels 51 and 52, doors 71 to close an inside of the vehicle 100 from an outside, a front glass 30 to offer a front view of the vehicle 100 to a driver inside of the vehicle 100, and side mirrors 81 and 82 to offer rear views of the vehicle 100 to the driver at an inside of the vehicle 100.

The wheels 51 and 52 includes front wheels 51 provided at a front of the vehicle 100, and rear wheels 52 provided at a rear of the vehicle 100.

The driving apparatus 80 is configured to provide rotational force to the front wheels 51 or the rear wheels 52 such that the body 1 may be moved forward or backward. The driving apparatus 80 as such may be an engine configured to generate rotational forces by combusting fossil fuel, or a motor configured to generate rotational force while supplied with power.

The doors 71 are rotatively provided at a left side and a right side of the body 1 such that a driver may enter an inside of the vehicle 100 when the door 71 is open, and the inside of the vehicle 100 is closed from an outside when the door 71 is closed.

The front glass 30 referred to as a windshield glass is provided at an upper side of a front of the body 1. The driver at an inside of the vehicle 100 may see a front of the vehicle 100 through the front glass 30.

In addition, the side mirrors 81 and 82 include a left side mirror 81 provided at a left side of the body 1 and a right side mirror 82 provided at a right side of the body 1. The driver at an inside of the vehicle 100 may confirm the conditions of the sides and the rear of the vehicle 100 with the naked eye.

Other than the above, the vehicle 100 may include various sensors configured to provide assistance by detecting an obstacle in the surroundings of the vehicle 100 such that the driver may recognize the conditions of the surroundings of the vehicle 100. For example, the vehicle 100 may include a number of cameras capable of obtaining images of the front, rear, left, and right sides of the vehicle 100.

As illustrated on FIG. 2, the vehicle 100 may include a dashboard at which a gear box 120, a center fascia 130, a steering wheel 140, and an instrumental panel 150 are provided.

The gear box 120 may be provided with a gear lever 121 configured to change the speed of the vehicle 100 installed thereto. In addition, as illustrated on the drawing, the gear box 120 may be provided with a dial manipulation unit 111 provided as to control the functions of a multimedia apparatus having a navigation apparatus 10 or an audio apparatus 133 or as to control the execution of the main functions of the vehicle 100, as well as an input apparatus 111 having various buttons, installed thereto.

The center fascia 130 may be provided with an air conditioning apparatus 132, the audio apparatus 133, and the navigation apparatus 10 installed thereto.

The air conditioning apparatus is provided as to cleanly maintain an inside of the vehicle 100 by adjusting the temperature, humidity, quality of air, and the flow of air of the inside of the vehicle 100. The air conditioning apparatus may include at least one outflow unit 132 installed at the center fascia 130 and configured to outflow air. The center fascia 130 may be provided with buttons or dials to control the air conditioning apparatus installed thereto. A user such as the driver may control the air conditioning apparatus of the vehicle 100 by use of the buttons or the dials disposed at the center fascia. The air conditioning apparatus may be controlled through the buttons of the input unit 110 or the dial manipulation unit 111 installed at the gear box 120.

In accordance with the embodiment, the center fascia 130 may be provided with the navigation apparatus 10 installed thereto. The navigation apparatus 10 may be formed while embedded at an inside of the center fascia 130 of the vehicle 100. According to one embodiment, the center fascia may be provided with an input unit configured to control the navigation apparatus 10 installed thereto. According to one embodiment, the input unit of the navigation unit 10 may be installed at a position other than the center fascia. For example, the input unit of the navigation apparatus 10 may be formed at the surroundings of a display unit 300 of the navigation apparatus 10. In addition, as another example, the input unit of the navigation apparatus 10 may be installed at the gear box 120.

The steering wheel 140 is an apparatus configured to adjust the driving direction of the vehicle 100, and may include a rim 141 provided as to be grasped by the driver, and a spoke 142 connected to a steering apparatus of the vehicle 100 and configured to connect the rim 141 and a hub of a rotational axis provided for steering. According to the embodiment, the spoke 142 may be provided with manipulation apparatuses 142a and 142b configured to control various apparatuses at an inside of the vehicle 100, as one example, the audio apparatus. The steering wheel 140 may perform a function to attract the attention of the driver so that the driver may drive safely. For example, the steering wheel 140, in a case when the driver is in a drowsy state while driving the vehicle, may provide a tactile warning to the driver through vibration, and in a case when risk of accident is occurred as a result of the change of the driving condition, the steering wheel 140 may provide a warning to the driver trough vibration as well.

In addition, the dashboard may be provided with an instrumental panel 150 capable of displaying driving speed, engine rotations per minute, or amount of remaining fuel of the vehicle 100 installed thereto. The instrumental panel 150 may include an instrumental panel display unit 151 to display conditions of the vehicle, information related to the driving of the vehicle as well as the information related to the manipulation of the multimedia apparatus.

The display unit 300 of the vehicle 100, for example, the display unit 300 of the navigation apparatus, while provided at an outside or an inside of the vehicle 100, may be provided with an image of the outside of the vehicle 100 obtained by a camera configured to obtain an image of the outside of the vehicle 100 displayed thereto. The driver may be aware of the surrounding conditions of the vehicle 100, which are difficult to confirm from the driver's seat, by looking at the image of the outside of the vehicle 100 being displayed at the display unit 300. However, the area to be confirmed by the driver may be blocked by an obstacle, various structures, or another vehicle in the surroundings of the vehicle 100. Therefore, in the embodiment of the present disclosure, a method of providing the driver with the image of the area, which is not displayed on the image obtained by the camera of the vehicle 100, by use of the image obtained at the CCTV installed at the surroundings of the vehicle 100 or the image obtained by another vehicle in the surroundings of the vehicle 100. Hereinafter, the above will be described in detail.

Figure 3:
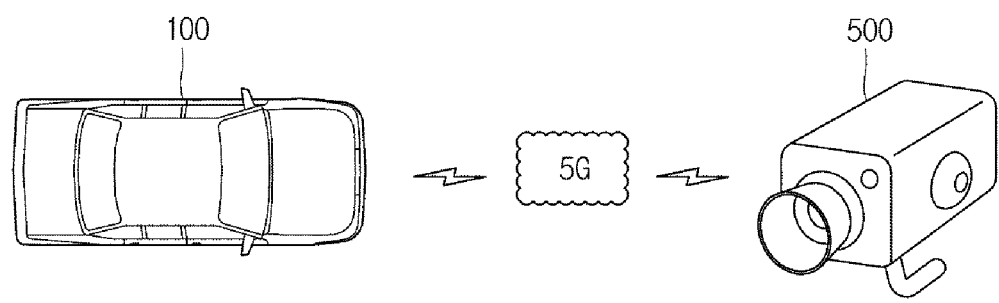
FIG. 3 is a drawing conceptually showing the vehicle obtaining a CCTV image through communications with a CCTV according to one embodiment of the present disclosure.
Figure 4:
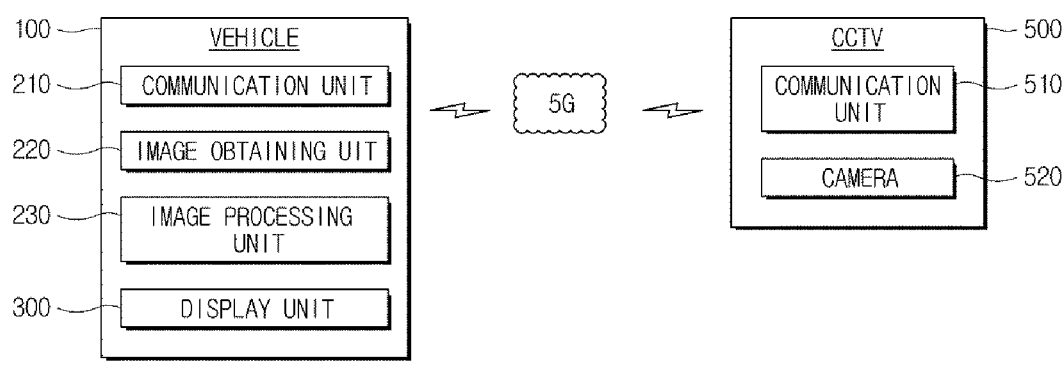
FIG. 4 is a block diagram showing a structure of the vehicle according to one embodiment of the present disclosure.

FIG. 3 is a drawing conceptually showing the vehicle according to one embodiment of the present disclosure obtaining a CCTV image through communications with the CCTV, and FIG. 4 is a block diagram showing a structure of the vehicle according to one embodiment of the present disclosure.

Referring to FIG. 4, the vehicle 100 according to the embodiment of the present disclosure includes an image obtaining unit 220 to obtain an image of the surroundings of the vehicle 100, the display unit 300 to display the image obtained at the image obtaining unit 220, a communication unit 210 to receive a CCTV 500 image, and an image processing unit 230 to process the image obtained at the image obtaining unit 220 and the image received from the communication unit 210 and then to display the processed image of the display unit 300. The CCTV 500 includes a communication unit 510 performing communications with the vehicle 100 and a camera 520 to photograph the conditions of roads.

The display unit 300 may be positioned at the center fascia 130, which is a central area of the dashboard. The display unit 300 as such may employ a Light Emitting Diode (LED) and an Organic Light Emitting Diode (OLED), both of which are capable of self-emitting light, or a Liquid Crystal Display (LCD) having a separate light emitting source. In addition, the display unit 300 may employ a Touch Screen Panel (TSP) configured to receive an input of a control command from a user, and display motion information corresponding to the control command that is input. The Touch Screen Panel may include a display to display motion information as well as a control command that a user may input, a touch panel to detect a contact coordinate at which a portion of the body of the user made contact, and a touch screen controller to determine the control command that is input by the user on the basis of the contact coordinate detected at the touch panel. The touch screen controller, by comparing the touch coordinate of the user detected through the touch panel and the coordinate of the control command displayed through the display, may recognize the control command that is input by the user.

The image obtaining unit 220 may include a front camera to obtain an image of a front of the vehicle 100, a left camera and a right camera to obtain images of left and right sides of the vehicle 100, and a rear camera to obtain an image of a rear of the vehicle 100. As long as the images of the front, rear, left, and right direction of the vehicle 100 are obtained, the positions and number of the installation of the cameras are not limited. The camera may include a CCD image sensor or a CMOS sensor.

The communication unit 210 may transmit/receive wireless signals to/from devices through a base station by use of the communication methods such as 3G (3Generation) and 4G (4Generation) communication methods, and other than the above, the communication unit 210 may transmit/receive wireless signals having data to/from terminals, which are within a predetermined distance, by use of communication methods such as Wireless LAN, Wi-Fi, Bluetooth, Zigbee, WFD (Wi-Fi Direct), UWB (Ultra wideband, IrDA (Infrared Data Association), BLE (Bluetooth Low Energy), and NFC (Near Field Communication).

In addition, the communication unit 210 may transmit/receive wireless signals by use of a 5G (5Generation) communication method. The 4G communication method is configured to use a radio frequency bandwidth of less than about 2 GHz, while the 5G communication method is configured to use a radio frequency bandwidth of about 28 GHz. However, the radio frequency bandwidth that the 5G communication method uses is not limited hereto.

A large scale antenna system may be employed at the 5G communication method. The large scale antenna system is referred to as a system provided to use a plurality of antennas, capable of covering high radio frequency bandwidth, and also capable of simultaneously transmitting/receiving high volume of data through multiple access. In detail, the large scale antenna system, by enabling radio frequency to be transmitted farther in a particular direction by adjusting the arrangements of the antenna terminals, is capable of transmitting in high volume, and the area in which the 5G communication network is accessible may be expanded.

Figure 5:
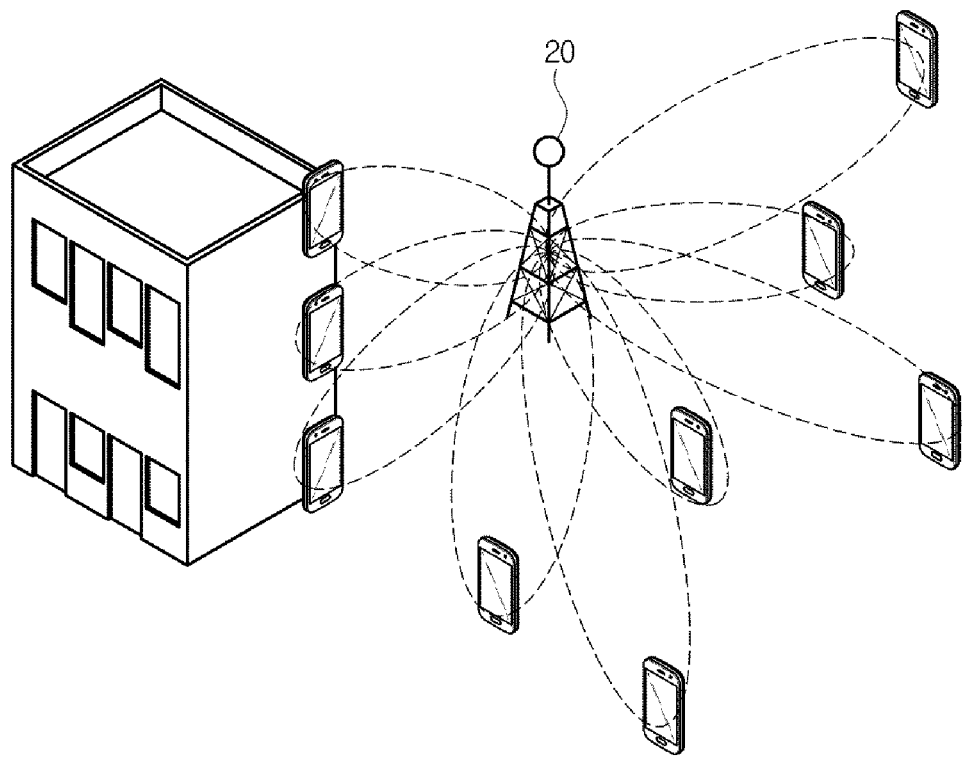
FIG. 5 is a drawing illustrating a large scale antenna system of a base station following a 5G communication method according to one embodiment of the present disclosure.
Figure 6A:
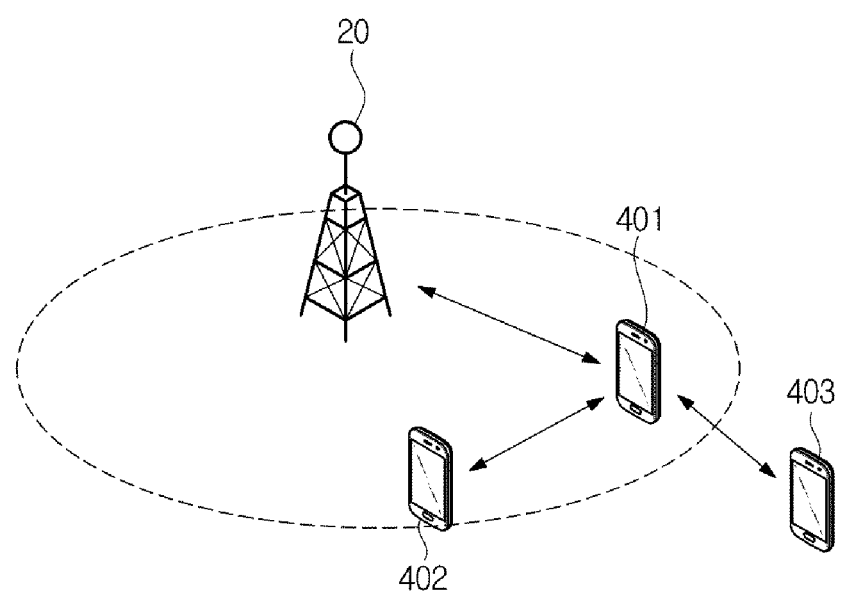
FIG. 6A to FIG. 6C are drawings illustrating a communication method on a 5G communication network.
Figure 6B:
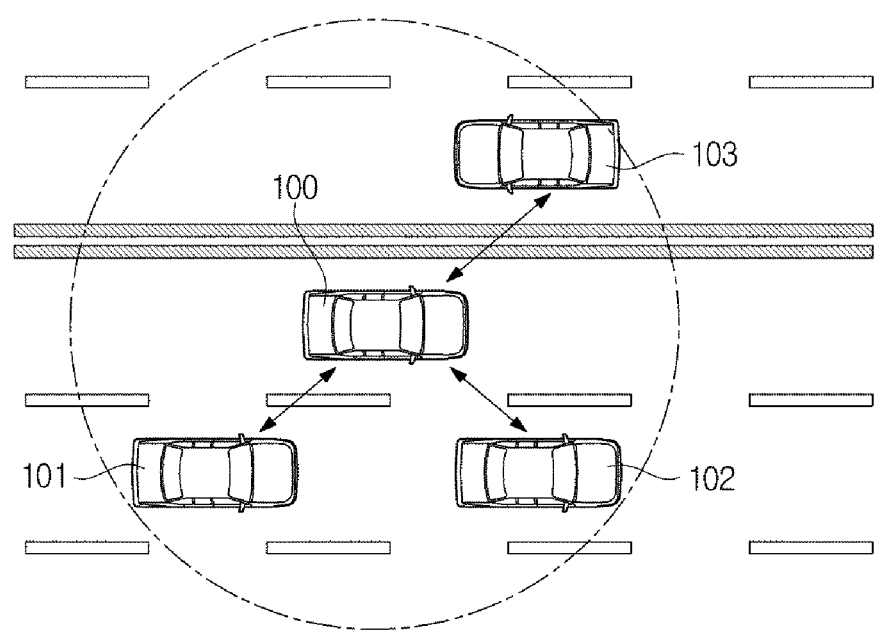
Figure 6C:
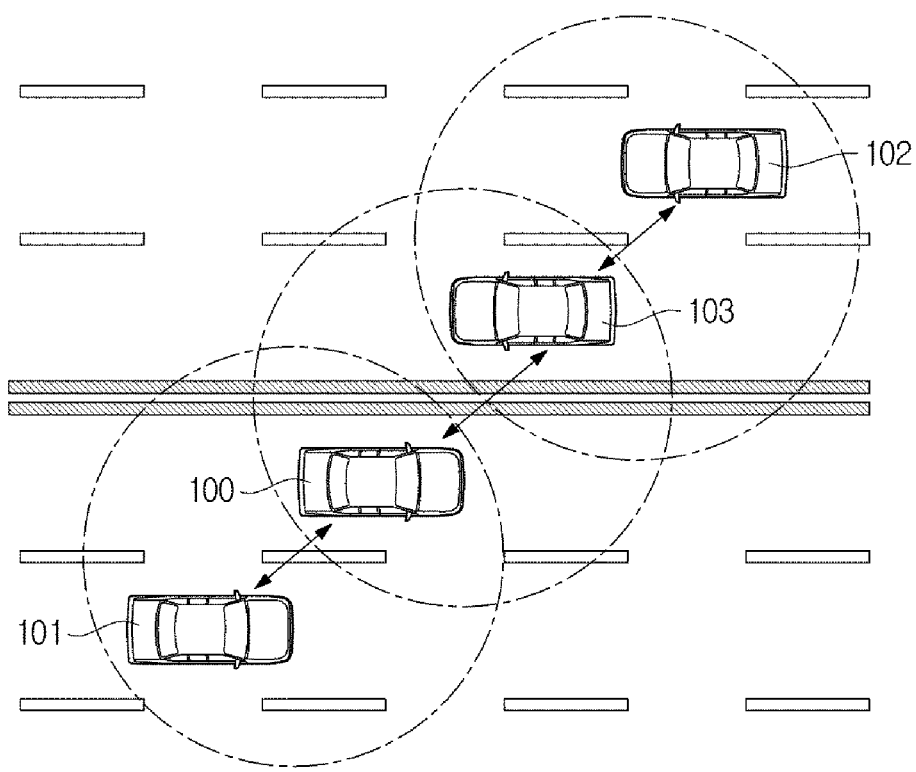

FIG. 5 is a drawing illustrating the large scale antenna system of a base station following the 5G communication method according to one embodiment of the present disclosure, and FIG. 6A to FIG. 6C are drawings illustrating a communication method on the 5G communication network.

Referring to FIG. 5, a base station 400 may simultaneously transmit/receive data from/to several devices through the large scale antenna system. In addition, the large scale antenna system, by reducing noise by minimizing the radio frequency leaking in any direction other than the direction in which the radio frequency is transmitted, an improvement of transmission quality and reduction of power usage may be realized.

In addition, the 5G communication method, differently from a conventional method of modulating transmission signals through an Orthogonal Frequency Division Multiplexing (OFDM) method, by transmitting wireless signals that are modulated through a Non-Orthogonal Multiplexing Access (NOMA) method, a multiple access of further more devices may be realized, and high-capacity transmission/reception may be simultaneously realized.

For example, the 5G communication method may offer a maximum transmission speed of about 1 Gbps. The 5G communication method may support an immersive communication, which is needed to provide high-capacity transmission as to transmit high-capacity contents such as UHD (Ultra-HD), 3D, and hologram, through a high-capacity transmission. Accordingly, a user may transmit/receive further delicate and immersive ultra high-capacity data further faster through the 5G communication method.

In addition, the 5G communication method may process at less than about 1 ms of maximum response speed in real-time basis. Accordingly, with the 5G communication method, a real-time service provided to respond before a user recognizes may be supported. For example, the vehicle 100, by receiving sensor information from various devices even during a course of driving, in addition to providing an autonomous driving system through a real-time processing, may provide various remote control features. In addition, the vehicle 100, through the 5G communication method, in addition to providing information regarding a risk of collision in real-time basis to a user by processing the sensor information with respect to another vehicle that is present in the surroundings of the vehicle in real-time basis, may provide traffic information that is anticipated to occur on the path of driving in real-time basis.

In addition, through the ultra real-time processing and high-capacity transmission provided by the 5G communication method, the vehicle 100 may provide data service to passengers at the inside of the vehicle 100. For example, the vehicle 100, by analyzing various web information and SNS information, may provide customized information that is suitable for the condition of the passengers. As one example, the vehicle 100, by collecting various information including eateries and attractions that are present at the surroundings of the path of driving through big data mining and then providing such in real-time basis, the passengers may be informed of information pertaining to the surroundings of the location on the path of driving in real-time basis.

Meanwhile, the 5G communication network, by segmenting cells, may support the network to be provided with high-density status and high-capacity transmission capability. Here, the cells are referred to as the areas formed by segmenting a large area into smaller areas as to efficiently use the radio frequency in mobile communications. At this time, communications among the terminals are supported by installing a small-output base station at the each cell. For example, the 5G communication network, by further segmenting through reducing the size of the each cell, may be formed in two-stage structure of macro-cell base stations-dispersed small base stations-communication terminals.

In addition, a relayed transmission of wireless signals through a multi-hop method may be performed at the 5G communication network. For example, as illustrated in FIG. 6A, a first terminal 401 may relay-transmit the wireless signal, which is to be transmitted by a third terminal 403 positioned at an outside of the network of the base station 400, to the base station 400. In addition, the first terminal 401 may relay-transmit the wireless signal, which is to be transmitted by a second terminal 402 positioned at an inside of the network of the base station 400, to the base station 400. As described above, at least one device of the devices provided for use may perform a relay-transmission through the multi-hop method by use of the 5G communication network, but is not limited hereto. Accordingly, while expanding the area supported by the 5G communication network, the buffering that may occur when many users are present in the cell may be solved.

Meanwhile, the 5G communication method is provided with a device-to-device (D2D) communication capacity between the vehicle 100 and wearable devices. The communication between devices is referred to as the communication taking place between devices, and is also referred to as the communication, not only transmitting/receiving the data that the devices detected through sensors, but also transmitting/receiving the wireless signals having various data stored at insides of the devices. In a case of the device-to-device communication method, wireless signals are not needed to be exchanged through the base station, and since the transmission takes place between the devices, energy may be conserved. At this time, as for the vehicle 100 and the wearable devices to use the 5G communication method, an antenna is needed to be embedded at an inside of the corresponding device.

The vehicle 100 may transmit/receive wireless signals to/from another vehicle that is present in the surroundings of the vehicle 100 through the device-to-device communication. For example, the vehicle 100, as illustrated in FIG. 6B, may perform the device-to-device communication with another vehicle 101, another vehicle 102, and another vehicle 103, all of which are present in the surroundings of the vehicle 100. Other than the above, in addition to the vehicle 100, the device-to-device communication may be performed with respect to a traffic information apparatus (not shown) installed at a crossroads.

As for another example, the vehicle 100, as illustrated on FIG. 6C, may transmit/receive wireless signals to/from the first vehicle 101 and the third vehicle 103 through the device-to-device communication, and the third vehicle 103 may transmit/receive wireless signals to/from the vehicle 100 and the second vehicle 102 through the device-to-device communication. That is, among the plurality of vehicles 100, 101, 102, and 103 positioned within a distance in which the device-to-device communication may take place, a virtual network is formed such that wireless signals may be transmitted/received.

Meanwhile, the 5G communication network, by expanding the area supported by the device-to-device communication, a communication with the device positioned farther may be performed through the device-to-device communication. In addition, while supporting a real-time process at less than about 1 ms of response speed and a communication of greater than about 1 Gbps of high-capacity communication, signals having desired data may be exchanged between vehicles in the course of driving.

For example, the vehicle 100, by accessing the other vehicle that is present in the surroundings of the vehicle 100, various servers 800, and systems in real time through the 5G communication method, may exchange data, and by processing the above data, through an augmented realization, various services such as road guide assistance service may be provided.

Other than the above, the vehicle 100, by using the bandwidth other than the above-described radio frequency bandwidth, may transmit/receive wireless signals having data through the base station or the device-to-device communication, and is not limited to the communication method provided to use the above-described radio frequency bandwidth.

As described above, the communication unit 210 may perform the device-to-device communication with the surrounding CCTV 500 by use of the 5G communication method. That is, the communication unit 210 may receive an image obtained at the CCTV 500 from the CCTV 500 through the device-to-device communication with respect to the CCTV 500. The area needed to be confirmed by the driver may not be shown on the image obtained by use of the camera of the vehicle 100 due to the surrounding objects, while the area needed to be confirmed by the driver may be shown on the image photographed at the CCTV 500 as the CCTV 500 is provided to photograph road conditions from an upper perspective. In addition, the area needed to be confirmed by the driver may be shown at the image photographed by use of the camera of the other vehicle, not only at the image photographed by use of the CCTV 500. While the CCTV 500 is provided to photograph the road conditions from the upper perspective, depending on the photographing angle, only a particular area of the area needed to be confirmed by the driver may be shown on the photographed image. Therefore, the communication unit 210 may receive an image through the device-to-device communication with respect to the at least one of the CCTV 500 and the communication unit of the other vehicle at the surroundings of the vehicle 100.

The image processing unit 230 is provided to process an image by performing a predetermined image processing at the image obtained at the camera and the CCTV 500 image.

The image processed as such may be displayed at the display unit 300. The image processing unit 230 may be accumulated at least at one System On Chip (SOC), which is embedded in the vehicle 100, and may be driven by use of a processor.

The image obtained at the camera and the CCTV 500 image may be directly displayed at the display unit 300 without proceeding through the image processing, as the driver may need to confirm the image obtained as originally obtained through the own viewpoint of the each camera, as well as the image obtained as originally obtained through the own viewpoint of the each CCTV 500.

For example, when performing parking toward the rear of the vehicle, the image photographed through the viewpoint of the rear camera is needed to be confirmed, or when checking traffic conditions of a road as well, the image photographed through the own viewpoint of the CCTV 500 is needed to be confirmed. In the case as the above, the image may not be needed to be processed through the image processing of the image processing unit 230.

However, as in the case when the obtained images from the cameras of the front, rear, left and right sides are needed to be composited and displayed with respect to the vehicle 100, when the surrounding images are needed to be matched and then composited with respect to the vehicle 100, the image processing unit 230 may perform a predetermined image processing with respect to the image obtained at the image obtaining unit 220 of the surroundings of the vehicle 100 or the CCTV 500 image received from the communication unit 210.

Figure 7:
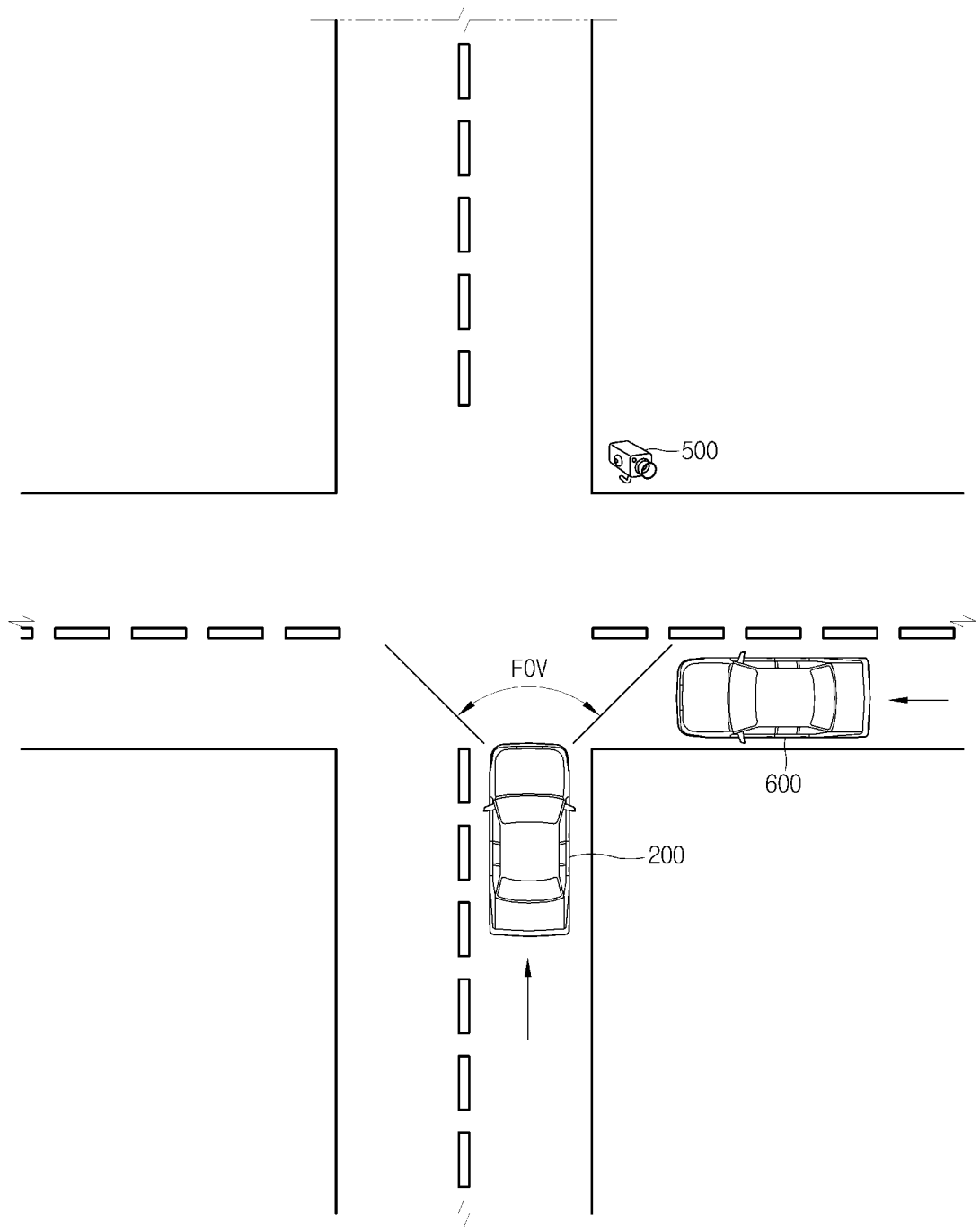
FIG. 7 is a drawing conceptually showing a case of when a surrounding vehicle is not confirmed at crossroads by the vehicle due to a surrounding structure.
Figure 8:
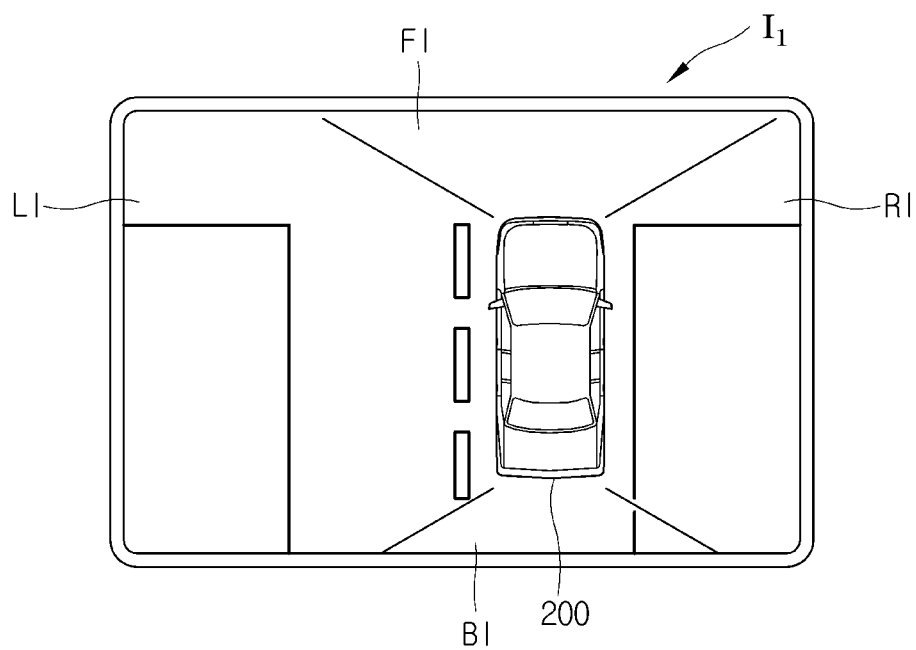
FIG. 8 is a drawing showing a displaying of an image obtained from the camera of the vehicle at the crossroads of FIG. 7 as a composite image with respect to the vehicle according to one embodiment of the present disclosure.

FIG. 7 is a drawing conceptually showing a case of when a surrounding vehicle is not confirmed at crossroads by the vehicle due to a surrounding structure, and FIG. 8 is a drawing showing a displaying of the image obtained from the camera of the vehicle at the crossroads of FIG. 7 as a composite image with respect to the vehicle according to one embodiment of the present disclosure.

Referring to FIG. 7, the vehicle 100 is entering the crossroads, and another vehicle 600 is also entering the crossroads on the right side of the vehicle 100. In a case when a traffic light is present, the vehicle 100 may move according to the signal. However, in a narrow road where the traffic light is not present, a risk of accident may be high under the condition as illustrated on FIG. 7, while a risk of accident may be present even on the road where the traffic light is present. On FIG. 7, crossroads are illustrated. While the crossroads are provided as one example for the convenience of description, the embodiment of the present disclosure may be applied to any condition having a risk of other accidents of different types.

In the condition having a risk of accidents as such, for the driver to further accurately recognize the surrounding conditions, the image processing unit 230 may provide a plane image 11 as illustrated on FIG. 8 by compositing images F1, R1, B1, and L1 obtained from the plurality of cameras of the vehicle 100 with respect to the vehicle. The image processing unit 230 enables the driver to realize the surrounding conditions of the vehicle 100 by displaying an image that is similar to the image of the surroundings of the vehicle 100 along with the vehicle 100 photographed from the sky, on the display unit 300. In the process as such, the image processing unit 230 is provided to generate the plane image of the each image by adjusting the viewpoint of the image obtained at the each camera, and then composite the plane image with respect to the vehicle 100 after the each plane image is disposed at the each of the front, rear, left, and right sides of the vehicle 100. The image processing unit 230, with respect to generating the plane image with respect to the vehicle 100, may use various algorithm or image processing methods. The plane image with respect to the vehicle 100 as such may not accurately show the surrounding conditions that the driver is needed to confirm due to the limitation of the Field of View (FOV) of the camera or the surrounding obstacle.

Under the condition illustrated on FIG. 7, when the image with respect to the other vehicle 600 entering the crossroads is obtained by use of the camera mounted at a front of the vehicle 100 and then the corresponding image is displayed at the display unit 300, the driver may carry out a determination that is suitable to the condition. However, in a case when the other vehicle 600 is present at a position that is out of the Field of View of the camera, the front camera may not be able to photograph the other vehicle 600 entering the crossroads. Even when the other vehicle 600 entering the crossroads is present in the Field of View, the other vehicle 600 entering the crossroads may not be photographed due to a corner of the crossroads or another obstacle.

In the case as above, as illustrated on FIG. 7, even when the other vehicle 600 has entered the crossroads from another direction, the other vehicle 600 entering the crossroads may not appear on the plane image of FIG. 8, that is, the plane image composited using the image obtained from the camera with respect to the vehicle 100. Under the condition shown on FIG. 7, when the driver has entered the crossroads after determining that no vehicle is entering the crossroads by referring to the image similar to the image illustrated on FIG. 8, a risk of collision with the other vehicle 600 may be high.

As illustrated in FIG. 7, in a case when the CCTV 500 is installed at the crossroads, since the CCTV 500 may photograph the other vehicle 600 entering the crossroads due to the position of installation and the direction of photographing, the vehicle 100 may provide a more accurate image by use or display of the image of the CCTV 500 to the driver.

When the vehicle 100 has entered the crossroads at which the CCTV 500 illustrated on FIG. 7 is present, the communication unit 210 may receive the image photographed at the CCTV 50 through the device-to-device communication with respect to the CCTV 500. The image being received from the CCTV 500 may be a still image or a video at the point of time when the vehicle 100 has entered the crossroads. The image being received from the CCTV 500 is preferably a video such that the driver may realize the change of the surroundings of the vehicle 100 in real time as the change may vary following the passing of time. The vehicle 100 may determine through the position of the vehicle 100 confirmed by use of a GPS apparatus whether the vehicle 100 has entered the crossroads, and by use of the speed of the vehicle 100 passing through the crossroads, may determine whether the vehicle 100 has passed through the crossroads, whether the driving direction of the vehicle 100 has changed at the crossroads, and whether the vehicle 100 is stopped at the crossroads. That is, the vehicle 100 may determine whether the image is to be received from the CCTV 500 or the other vehicle on the basis of the position information and the speed information of the vehicle 100, and furthermore, may determine whether to display a plane image with respect to the vehicle 100, which is to be described later. For example, when the vehicle 100 has entered the crossroads at a predetermined reference speed, for example, in a range between about 5 km/h and about 20 km/h, the vehicle 100 receives an image from the CCTV 500 or the other vehicle, and by use of the image received and the image obtained from the camera, may display the plane image with respect to the vehicle 100, which is to be described later, at the display unit 300.

Figure 9:
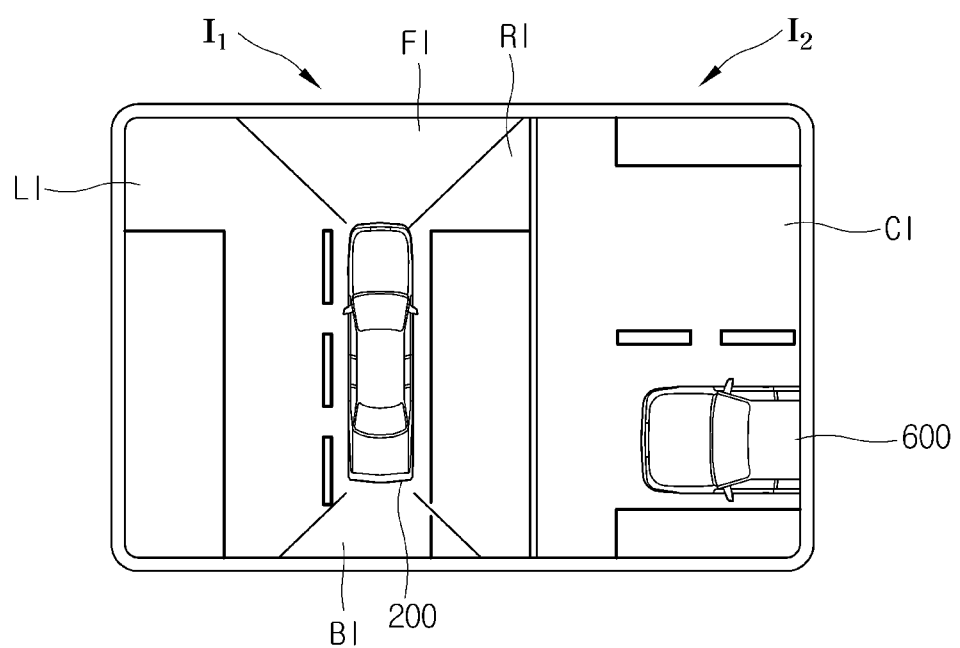
FIG. 9 is a drawing showing a displaying of the image obtained from the camera of the vehicle as a composite image with respect to the vehicle, as well as the image received from the surrounding CCTV, at the crossroads of FIG. 7 according to one embodiment of the present disclosure.
Figure 10:
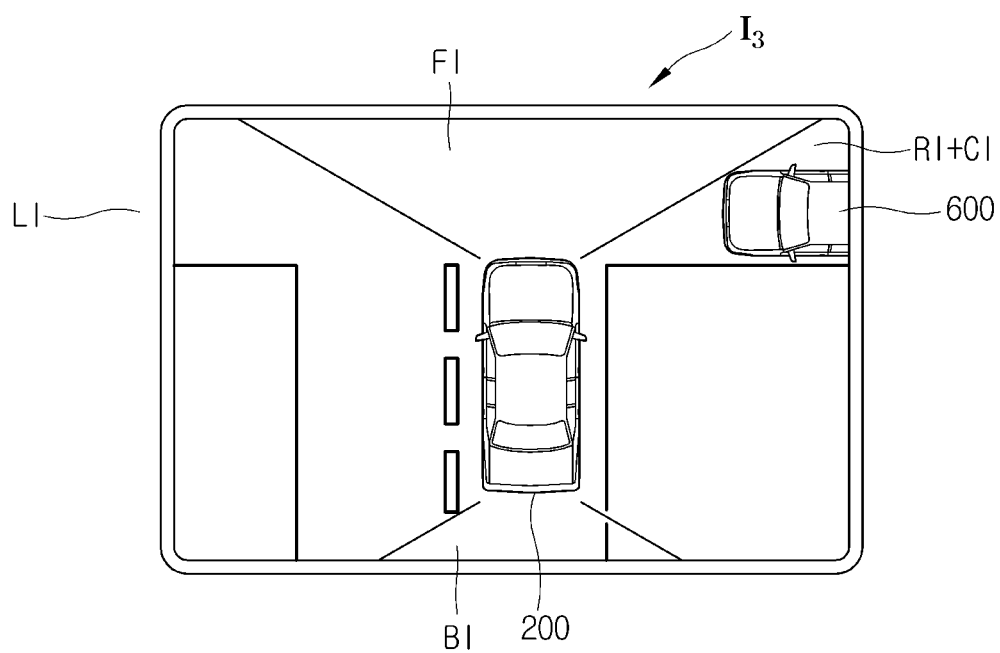
FIG. 10 is a drawing showing a displaying of the image obtained from the camera of the vehicle, as well as the image received from the surrounding CCTV, at the crossroads of FIG. 7 as a composite image with respect to the vehicle according to one embodiment of the present disclosure.

Referring to FIG. 9 and FIG. 10, a method of providing an image of the surrounding conditions of the vehicle 100 to the driver by combining the CCTV 500 image and the image from the camera of the vehicle 100 will be described more in detail.

FIG. 9 is a drawing showing the images F1, R1, B1, and L1 obtained from the camera of the vehicle 100 composited as an image 11 with respect to the vehicle 100, and an image 12 displaying an image C1 received from the surrounding CCTV 500 according to one embodiment of the present disclosure, and FIG. 10 is a drawing showing the images F1, R1, B1, and L1 obtained from the camera of the vehicle 100 at the crossroads of FIG. 7 and the image C1 received from the surrounding CCTV 500 at the crossroads of FIG. 7 composited as an image 13 with respect to the vehicle 100.

When the CCTV 500 image is received from the communication unit 210, the image processing unit 230 may display the plane image with respect to the vehicle 100 generated from the image obtained from the camera, as well as the CCTV 500 image, at the display unit 300, as illustrated on FIG. 9.

That is, the display unit 300 may separately display the plane image with respect to the vehicle 100 and the CCTV 500 image by dividing the screen of the display unit 300. At this time, as illustrated on FIG. 9, the image processing unit 230, by adjusting the viewpoint of the CCTV 500 image, may convert the CCTV 500 image into a plane image, and display the plane image of the display unit 300, as similar to the plane image with respect to the vehicle 100. As for another example, the image processing unit 230, without converting the CCTV 500 image into a plane image, may directly display an image as to reflect the own viewpoint of the CCTV 500 image. The CCTV 500 image may be a plurality of images obtained from the plurality of CCTVs 500 at the surroundings of the crossroads. That is, the each plane image of the each of the plurality of CCTV 500 images may be separately displayed by dividing the screen of the display unit 300 with the plane image with respect to the vehicle 100, a single plane image that is output through an image processing with respect to the plurality of CCTV 500 images may be separately displayed, or the image reflecting the own viewpoint of the plurality of CCTV 500 images may be separately displayed as originally obtained.

As for another embodiment, not only the CCTV 500, the image received from the other vehicle may be displayed separately from the plane image with respect to the vehicle 100, or the plane image output by combining the CCTV 500 image and the image received from the other vehicle may be displayed separately from the plane image with respect to the vehicle 100.

The driver, by confirming the CCTV 500 image as well as the plane image with respect to the vehicle 100, may recognize that the other vehicle 600 has entered the crossroads.

As for still another embodiment, when the CCTV 500 image is received from the communication unit 210, the image processing unit 230 is provided to process the image of the surroundings of the vehicle 100 obtained at the camera and the CCTV 500 image as a plane image, and by disposing the plane image of the image of the surroundings of the vehicle 100 and the plane image of the CCTV 500 image with respect to the vehicle 100, a plane image with respect to the vehicle 100 as illustrated on FIG. 10 may be generated.

The image processing unit 230 is provided to determine the portion, which is not shown on the plane image of the image of the surroundings of the vehicle 100 from the plane image of the CCTV 500 image by comparing the plane image of the CCTV 500 image with the plane image of the image of the surroundings of the vehicle 100, and the determined portion may be extracted from the plane image of the CCTV 500 image, The image processing unit 230 may composite a plane image with respect to the vehicle 100 by matching the extracted portion with the plane image of the image of the surroundings of the vehicle 100.

As illustrated on FIG. 10, after the image obtained from the camera and the CCTV 500 image are composited as a plane image with respect to the vehicle 100, and when the plane image as such is provided to a user, the user may further intuitively recognize the other vehicle 600 entering the crossroads.

The plane image described above is provided as one example and any image may be sufficient if provided with an identical viewpoint as the image from the camera structuring the image composited with respect to the vehicle 100 and the CCTV 500 image.

Figure 11:
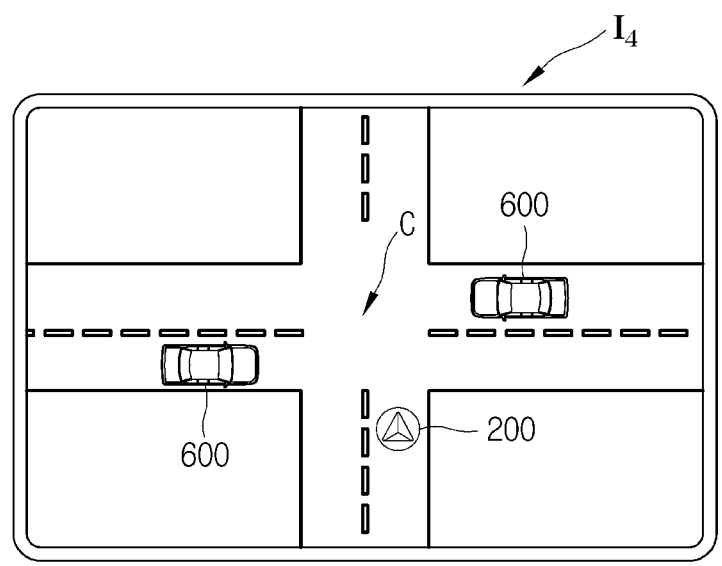
FIG. 11 is a drawing showing a displaying of the image obtained from the camera of the vehicle, as well as the image received from the surrounding CCTV, at the crossroads of FIG. 7 as a composite image with respect to the crossroads according to one embodiment of the present disclosure.

As for still another embodiment, when the CCTV 500 image is received from the communication unit 210, the image processing unit 230 is provided to process the image of the surroundings of the vehicle 100 obtained at the camera and the CCTV 500 image as a plane image, and by disposing the plane image of the image of the surroundings of the vehicle 100 and the plane image of the CCTV 500 image with respect to the crossroads C, the plane image 14 having the crossroads C as a center as illustrated on FIG. 11 may be generated.

The image processing unit 230 is provided to determine the portion, which is not shown in the plane image of the image of the surroundings of the vehicle 100 from the plane image of the CCTV 500 image by comparing the plane image of the CCTV 500 image with the plane image of the image of the surroundings of the vehicle 100, and the determined portion may be extracted from the plane image of the CCTV 500 image. The image processing unit 230 may composite a plane image with respect to the crossroads C by matching the extracted portion with the plane image of the image of the surroundings of the vehicle 100. The position of the vehicle 100 on the plane image composited as such may be displayed in the form of a particular symbol or an image.

As illustrated on FIG. 11, after the image obtained from the camera and the CCTV 500 image are composited as a plane image having the crossroads C as a center, and when the plane image as such is provided to a user, the user may further intuitively recognize the other vehicle 600 entering the crossroads.

The plane image described above is provided as one example and any image may be sufficient if provided with an identical viewpoint as the image from the camera structuring the composited image having the vehicle as a center and the CCTV 500 image.

Not only by use of the image received from the CCTV 500, but also by use of the image received from the other vehicle, the portion not being checked at the CCTV 500 image may be supplemented through the image from the other vehicle, and thus a further accurate plane image may be output.

As described above, the vehicle 100, while showing the image from the camera and the CCTV 500 image as a composited image with respect to the vehicle 100 at the display unit 300, may alert the driver through a speaker in the form of voice that the other vehicle 600 is entering the crossroads from a different direction.

Figure 12:
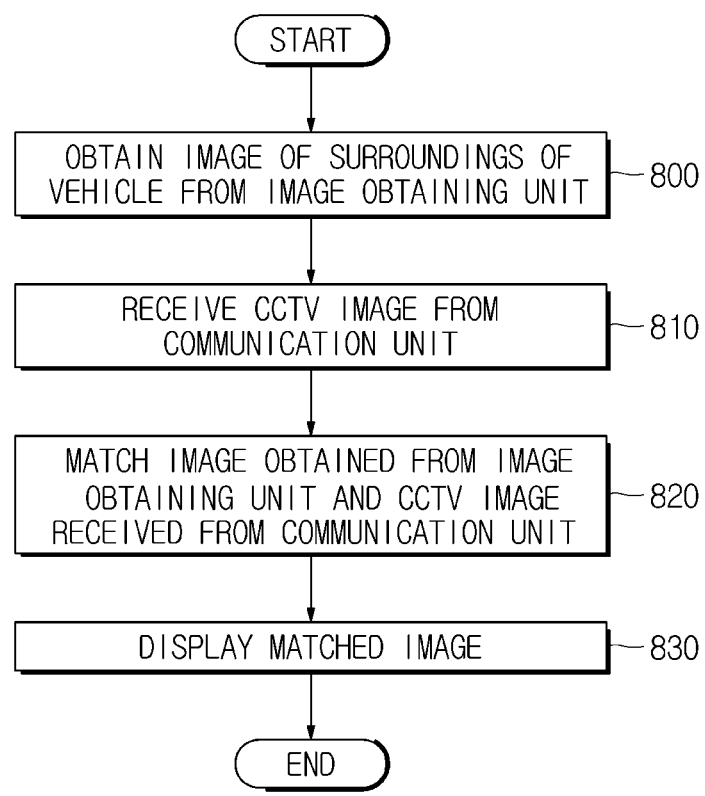
FIG. 12 is a flow chart showing a method for controlling the vehicle according to one embodiment of the present disclosure.

FIG. 12 is a flow chart showing a method for controlling the vehicle according to one embodiment of the present disclosure.

Referring to FIG. 12, the image of the surroundings of the vehicle 100 is obtained at the image obtaining unit 220 of the vehicle 100 (800), and the CCTV 500 image is received from the CCTV 500 at the surroundings of the vehicle 100 (810).

The cameras provided at the front, rear, left, and right directions of the vehicle 100 are provided to obtain images of the surroundings of the vehicle 100, and the communication unit 210 may receive an image from the CCTV 500 by performing the device-to-device communication with the CCTVs 500 at the surroundings by use of the 5G communication method. In addition, images may be received from the other vehicle. The area to be confirmed by the driver may not appear on the images obtained from the cameras of the vehicle 100 due to surrounding objects. However, since the CCTV 500 is provided to photograph road conditions from an upper perspective and the other vehicle is provided to photograph road conditions from a different direction with respect to the vehicle 100, the area that the driver needs to confirm may appear on the image photographed from the CCTV 500 or on the image photographed from the other vehicle.

The image processing unit 230 is provided to match the image of the surroundings of the vehicle 100 obtained from the image obtaining unit 220 and the CCTV 500 image received from the communication unit 210 (820), and display the matched image at the display unit 300 (830).

The image processing unit 230 may be provided to process an image by performing a predetermined image processing on the image obtained from the camera and the CCTV 500 image. The image processed as such may be displayed at the display unit 300.

As illustrated in FIG. 7, in a case when the CCTV 500 is installed at the crossroads, the CCTV 500 may photograph the other vehicle 600 entering the crossroads due to the installation position and photographing direction, and thus the vehicle 100 may provided with a further accurate image by use of the image of the CCTV 500 to the driver.

When the CCTV 500 image is received at the communication unit 210, the image processing unit 230 may display at the display unit 300 the plane image with respect to the vehicle 100 generated from the image obtained from the camera, as well as the CCTV 500 image, as illustrated in FIG. 9.

That is, the display unit 300 may separately display the plane image with respect to the vehicle 100 and the CCTV 500 image by dividing the screen of the display unit 300. At this time, as illustrated in FIG. 9, the image processing unit 230 may convert the CCTV 500 image into the plane image, as the plane image with respect to the vehicle 100, by adjusting the viewpoint of the CCTV 500 image, and then display such at the display unit 300. As for another example, the image processing unit 230 may display the image reflecting the viewpoint of the CCTV 500 image without converting the CCTV 500 image into the plane image. The CCTV 500 image may be the plurality of images received from the plurality of CCTVs 500 at the surroundings of the crossroads. That is, the each plane image of the each of the plurality of CCTV 500 images may be separately displayed at a different area that is being distinguished from the area at which the plane image with respect to the vehicle 100 is displayed, a single plane image output through an image processing with respect to the plurality of CCTV 500 images may be separately displayed, or the image reflecting the viewpoint of the plurality of CCTV 500 images may be separately displayed as originally obtained. Not only the CCTV 500 image, but also the image received from the other vehicle may be separately displayed with respect to the plane image with respect to the vehicle 100, or the plane image that is output by combining the CCTV 500 image and the image received from the other vehicle may be separately displayed with respect to the plane image with respect to the vehicle 100.

The driver, by confirming the CCTV 500 image as well as the plane image with respect to the vehicle 100, may recognize that the other vehicle 600 has entered the crossroads. As for another embodiment, when the CCTV 500 image is received from the communication unit 210, the image processing unit 230 may process the image of the surroundings of the vehicle 100 obtained from the camera and the CCTV 500 image as a plane image, and by disposing the plane image of the image of the surroundings of the vehicle 100 and the plane image of the CCTV 500 image with respect to the vehicle 100, the plane image with respect to the vehicle 100 as illustrated in FIG. 8 may be generated.

The image processing unit 230 is provided to determine the portion, which is not shown in the plane image of the image of the surroundings of the vehicle 100 from the plane image of the CCTV 500 image by comparing the plane image of the CCTV 500 image with the plane image of the image of the surroundings of the vehicle 100, and the determined portion may be extracted from the plane image of the CCTV 500 image. The image processing unit 230 may composite a plane image with respect to the vehicle 100 by matching the extracted portion with the plane image of the image of the surroundings of the vehicle 100.

As illustrated in FIG. 10, after the image obtained from the camera and the CCTV 500 image are composited as a plane image with respect to the vehicle 100, and when the plane image as such is provided to a user, the user may further intuitively recognize the other vehicle 600 entering the crossroads.

As for still another embodiment, when the CCTV 500 image is received from the communication unit 210, the image processing unit 230 is provided to process the image of the surroundings of the vehicle 100 obtained at the camera and the CCTV 500 image as a plane image, and by disposing the plane image of the image of the surroundings of the vehicle 100 and the plane image of the CCTV 500 image with respect to the crossroads, the plane image 14 with respect to the crossroads as illustrated on FIG. 11 may be generated. The image processing unit 230 is provided to determine the portion, which is not shown at the plane image of the image of the surroundings of the vehicle 100 from the plane image of the CCTV 500 image by comparing the plane image of the CCTV 500 image with the plane image of the image of the surroundings of the vehicle 100, and the determined portion may be extracted from the plane image of the CCTV 500 image. The image processing unit 230 may composite a plane image with respect to the crossroads by matching the extracted portion with the plane image of the image of the surroundings of the vehicle 100. The position of the vehicle 100 on the plane image composited as such may be displayed in the form of a particular symbol or an image. The position of the vehicle 100 on the plane image composited as such may be displayed in the form of a particular symbol or an image. As illustrated on FIG. 11, after the images obtained from the camera and the CCTV 500 image are composited as a plane image with respect to the crossroads, and when the plane image as such is provided to a user, the user may recognize the traffic conditions of the surroundings of the crossroads easier than when confirming the plane image with respect to the vehicle 100. The plane image described above is provided as one example and any image may be sufficient if provided with an identical viewpoint as the image from the camera structuring the composited image with respect to the vehicle 100 and the CCTV 500 image. Not only by use of the image received from the CCTV 500, but also by use of the image received from the other vehicle, the portion not being checked at the CCTV 500 image may be supplemented through the image from the other vehicle, and thus a further accurate plane image may be output.

As is apparent from the above, a vehicle in accordance with the embodiments of the present disclosure can offer a driver with an image of the area that is difficult to be confirmed through a camera of the vehicle by use of the image obtained from the CCTV at the surroundings of the vehicle, and therefore, the driver may accurately confirm the surroundings of the vehicle and drive safely through a variety of roads.

The methods according to the embodiments of the present disclosure may be recorded at a medium readable by use of a computer after implemented in the form of a program command that may be performed through various means of computer. The medium readable by use of a computer may include the program command, a data file, or a data structure, or a combination of such. The program command recorded at the medium as above may be the program command designed and structured particularly for the embodiments, or may be the program command made to be public for use by those skilled in the art. As for the example of the medium readable by use of a computer, an optical media such as a magnetic media, a CD-ROM, or a DVD, a magneto-optical media such as a floptical disk, or a hardware apparatus such as a ROM, a RAM, or a flash memory structured particularly as to store and perform the program command may be present.

As for the program command, not only the machine code produced by a complier, but also the high level language code provided to be performed by use of a computer through use of an interpreter may be present. The hardware apparatus as above may be structured as to be performed as a software module provided at least one module thereof such that the motions of the embodiment of the present disclosure may be performed, and the reverse of the above may be same as well.

Although a few embodiments of the present disclosure have been shown and described, it would be appreciated by those skilled in the art that changes may be made in these embodiments without departing from the principles and spirit of the disclosure, the scope of which is defined in the claims and their equivalents. For example, the arts described may be performed in orders that are different from the methods described above, and/or the systems, structures, apparatuses, or circuits described above may be coupled or combined in shapes that are different from the methods described above or may be contradicted or substituted, while the results that are suitable may be accomplished.

Therefore, other implementations and other embodiments, as well as those that are identical to the scope of the present disclosure may be included in the scope of the present disclosure that is to be described hereinafter.

What is claimed is:

1. A vehicle, comprising:
a camera for obtaining an image of surroundings of the vehicle;
a communicator for receiving an image from at least one of a closed-circuit television (CCTV) and another vehicle in the surroundings of the vehicle;
a display for displaying the image obtained by the camera and the image received from the CCTV or the image received from the another vehicle; and
a processor for processing the image obtained by the camera and the image received by the communicator so as to display the images at the display,
wherein the communicator determines whether the vehicle has entered a crossroad based on a position of the vehicle, and receives the image from the at least one of the CCTV and the another vehicle if the vehicle has entered the crossroad and a speed of the vehicle is equal to or lower than a predetermined speed,
wherein the processor processes the image of the surroundings of the vehicle obtained by the camera as a first plane image, and processes the image received from the CCTV or the image received from the another vehicle as a second plane image, and
wherein the processor extracts a portion from the second plane image processed from the image received from the CCTV or the image received from the another vehicle, the portion that is not covered by the first plane image processed from the image of the surroundings of the vehicle obtained by the camera, and composites the first plane image with the second plane image with respect to the crossroad as a composite image by matching the extracted portion from the second plane image with the first plane image of the surroundings of the vehicle.

2. The vehicle of claim 1, wherein
the display displays the first plane image of the image of the surroundings of the vehicle obtained by the camera, and the second plane image processed from the image received from the CCTV or the image received from the another vehicle.

3. The vehicle of claim 1, wherein
the display displays a composite image of the first plane image of the image of the surroundings of the vehicle obtained by the camera that is composited with respect to the vehicle, and displays the second plane image processed from the image received from the CCTV or the image received from the another vehicle separately from the composite image.

4. The vehicle of claim 1, wherein
the display displays the first plane image of the image of the surroundings of the vehicle obtained by the camera, and displays a composite image of the second plane image processed from the image received from the CCTV or the image received from the another vehicle that is composited with respect to the vehicle.

5. The vehicle of claim 1, wherein
the display displays the first plane image of the image of the surroundings of the vehicle obtained by the camera and a composite image of the second plane image processed from the image received from the CCTV or the image received from the another vehicle that is composited with respect to the crossroad, and displays the position of the vehicle on the composite image.

6. The vehicle of claim 1, wherein
the processor composites the first plane image of the image of the surroundings of the vehicle with respect to the vehicle.

7. The vehicle of claim 1, wherein
the processor composites the first plane image of the image of the surroundings of the vehicle with the second plane image processed from the image received from the CCTV or the image received from the another vehicle with respect to the vehicle as a composite image.

8. The vehicle of claim 7, wherein
the processor composites the first plane image of the image of the surroundings of the vehicle with the second plane image processed from the image received from the CCTV or the image received from the another vehicle with respect to the vehicle as a composite image by matching the extracted portion from the second plane image with the first plane image of the surroundings of the vehicle.

9. The vehicle of claim 1, wherein
the camera is provided to obtain an image having at least one of front, rear, left, and right directions of the vehicle.

10. The vehicle of claim 1, wherein
the communicator receives an image through a device-to-device (D2D) communication from at least one of a CCTV and another vehicle that are present in the surroundings of the vehicle.

11. A method for controlling a vehicle, comprising:
obtaining, by an camera of the vehicle, an image of surroundings of the vehicle;
determining, by a communicator of the vehicle, whether the vehicle has entered a crossroad based on a position of the vehicle;
receiving, by the communicator of the vehicle, an image from at least one of a closed-circuit television (CCTV) and another vehicle at the surroundings of the vehicle if the vehicle has entered the crossroad and a speed of the vehicle is equal to or lower than a predetermined speed;
displaying, by a display of the vehicle, the image obtained by the camera, and the image received from the CCTV or the image received from the another vehicle;
processing, by a processor of the vehicle, the image of the surroundings of the vehicle obtained by the camera as a first plane image, and processing the image received from the CCTV or the image received from the another vehicle as a second plane image;
extracting, by the processor of the vehicle, a portion from the second plane image processed from the image received from the CCTV or the image received from the another vehicle, the portion that is not covered by the first plane image processed from the image of the surroundings of the vehicle obtained by the camera; and
compositing, by the processor of the vehicle, the first plane image with the second plane image with respect to the crossroad as a composite image by matching the extracted portion from the second plane image with the first plane image of the surrounding of the vehicle.

12. The method for controlling the vehicle of claim 11, further comprising
compositing the first plane image of the image of the surroundings of the vehicle with respect to the vehicle as a composite image.

13. The method for controlling the vehicle of claim 11, further comprising
compositing the first plane image of the image of the surroundings of the vehicle with the second plane image processed from the image received from the CCTV or the image from the another vehicle with respect to the vehicle as a composite image.

14. The method for controlling the vehicle of claim 13, wherein
the compositing of the first plane image of the image of the surroundings of the vehicle with the second plane image processed from the image received from the CCTV or the image received from the another vehicle with respect to the vehicle comprises:
compositing the first plane image of the surroundings of the vehicle with the second plane image processed from the image received from the CCTV or the image received from the another vehicle with respect to the vehicle as a composite image by matching the extracted portion from the second plane image with the first plane image of the surrounding of the vehicle.

15. The method for controlling the vehicle of claim 11, wherein
the displaying of the image obtained by the camera, and the image received from the CCTV or the image received from the another vehicle comprises
displaying, by the display, the first plane image of the image of the surroundings of the vehicle obtained by the camera, and displaying the second plane image processed from the image received from the CCTV or the image received from the another vehicle.

16. The method for controlling the vehicle of claim 11, wherein
the displaying of the image obtained by the camera, and the image received from the CCTV or the image received from the another vehicle further comprises
displaying the a composite image of the first plane image of the image of the surroundings of the vehicle obtained by the camera that is composited with respect to the vehicle; and
displaying the second plane image processed from the image received from the CCTV or the image received from the another vehicle separately from the composite image.

17. The method for controlling the vehicle of claim 11, wherein
the displaying of the image obtained by the camera, and the image received from the CCTV or the image received from the another vehicle further comprises
displaying the first plane image of the image of the surroundings of the vehicle obtained by the camera, and displaying a composite image of the second plane image processed from the image received from the CCTV or the image received from the another vehicle that is composited with respect to the vehicle.

18. The method for controlling the vehicle of claim 11, further comprising
displaying the position of the vehicle on the composite image that is composited with respect to the crossroad.

* * * * *